United States Patent
Zebarth

[15] 3,707,018
[45] Dec. 26, 1972

[54] METHOD FOR KILLING AND BLEEDING POULTRY

[72] Inventor: Ralph S. Zebarth, Kansas City, Mo.
[73] Assignee: Gainesville Machine Company Inc., Gainesville, Ga.
[22] Filed: Dec. 30, 1969
[21] Appl. No.: 889,305

[52] U.S. Cl. .................................................17/45
[51] Int. Cl. ..............................................A22c 21/00
[58] Field of Search.............................17/11, 12, 45

[56] References Cited

UNITED STATES PATENTS 2,081,229  5/1937  Fisher et al. .............................17/11
2,687,550  8/1954  Coleman ..................................17/11

Primary Examiner—Lucie H. Laudenslager
Attorney—Edward Taylor Newton, George M. Hopkins and William J. Ornsby, Jr.

[57] ABSTRACT

A method for killing and bleeding poultry consisting of forming an opening through the skull into the brain cavity of a bird, and allowing it to bleed through said opening.

6 Claims, No Drawings

METHOD FOR KILLING AND BLEEDING POULTRY

This invention relates to new and useful improvements in methods for killing and bleeding poultry in modern poultry processing plants, and has as its principal object the provision of a killing and bleeding method which is extremely rapid, efficient, humane, which is readily adapted to be performed by automatic apparatus, and which produces carcasses of a more consistently high quality.

In most poultry processing plants, the birds are suspended by their feet or legs on suitable shackles on a moving conveyor line, killed by some method and their blood drained as they move along said conveyor, then moved by said conveyor through a hot-water scalding bath to prepare them for picking, and then through picking machines by which the feathers are removed. The method of killing most commonly used is for human operators with sharp knives, or automatic apparatus with cutting members, to cut the throats just under the jaws to sever the jugular veins, the conveyor line before the scalding bath being of sufficient length to allow time for the birds to die and to bleed thoroughly before they reach said bath.

However, this killing method is subject to certain shortcomings and disadvantages. The human operators, though they may be highly skilled, often have perhaps only two seconds of time to devote to each bird, with the result that the cuts may not be properly performed. The most common faults are that the jugular veins may tend to "roll" with the knife blades, so that they are not severed or are only partially severed, so that subsequent bleeding is impeded, or that the knife blades may sever or partially sever the trachea, or windpipe, or nick the spinal cord. If the jugular veins are not properly severed, the bird, though dead, may not be properly bled by the time it reaches the scalding bath. Such partially bled carcasses, called "misbled" carcasses and more commonly called "cadavers", will have greater or less degrees of discoloration or lividity due to the blood remaining therein, and are thereby downgraded in value or in some cases must be discarded as a complete loss. Or the bird may not be even dead when it reaches the scalding bath, with the result that the bird actually dies by drowning in said bath, and in so doing breathes quantities of the unavoidably highly contaminated water of said bath into its lungs. This also may downgrade the carcass. If the trachea is cut, the bird dies by strangulation and fights wildly, scattering blood in every direction, and giving the name "blood tunnel" to that length of the conveyor between the killing station and the scalding bath. This, of course, creates a problem of disposal and sanitation. If the spinal cord is nicked, it causes a sudden tightening or spasm of the muscles, including the sphincter muscles of the feather follicles, and this renders the subsequent removal of the feathers by the picking machines quite difficult. Another defect of the knife-killing method is that it creates openings through the neck skin, and loose flaps of skin. Thus, in the scalding bath, the contaminated water of said bath tends to work through said neck openings to contaminate a portion of the neck meat. This contamination continues in the picking machine wherein the rubber picking fingers usually employed may tend to pull the neck skin flaps back to expose more of the neck meat to contamination. This contamination of the necks has not heretofore been considered and particular problem, since necks had little commercial value and were often consigned to the rendering plant for eventual use in fertilizers, pet and livestock feed, and the like. However, comparatively recently developed methods of recovering the neck meat by improved de-boning apparatus have rendered the necks themselves valuable as a source of meat. Moreover, the neck contamination resulting from knife-killing now renders it likely that processors intending to use necks for human consumption will be required, if the poultry is knife-killed, to cut off and discard about 2 inches of each neck. This of course would represent a substantial loss.

Accordingly, the principal object of the present invention is the provision of a killing and bleeding method which overcomes all the above enumerated difficulties in that it causes instant death and rapid, efficient bleeding, is not subject to the difficulties resulting from inefficient cutting or unintentional cutting or nicking of the trachea or spinal column in the knife method, and which does not cause contamination of the neck meat in the scalding bath.

Other objects are economy, efficiency, simplicity, dependability, and speed.

With these objects in view, as well as other objects which will appear in the course of the specification, the method contemplated by the present invention involves, very simply, the formation of a hole or opening through the skull of a bird and well into the brain cavity thereof. This may be done by cutting, chopping, drilling, sawing, or by localized heavy impact, or in fact by any other mechanical operation capable of forming such an opening. Another possibility is simply to cut, chop, saw, or slice off the cap of the skull. Although no specific apparatus for performing this operation is shown, nor is it necessary to concept of the present invention, it will be obvious that such apparatus, of any of many different types, could be utilized for this operation, to be performed on the birds as they move along a conveyor line. The method is thus well adapted for use in automated processing plants.

This method of course causes death of the bird as nearly instantaneously as is humanly possible, and also causes extremely copious and rapid bleeding, the bleeding aspect taking advantage of the fact that, as in all animals, a large proportion of the birds blood is supplied directly from the heart to the brain, to assure the essential supply of oxygen to the brain, before passing to other portions of the body, so that opening of the skull is almost tantamount to tapping the heart itself. For efficiency and speed of bleeding, the opening or wound should extend not only through the skull itself, but well into the brain cavity, in order to cut and expose a large number of blood vessels for more copious bleeding, and the skull opening should of course be sufficiently large not to restrict and impede the bleeding. The speed and efficiency of blood drainage obtainable by the present method is at least as great as that obtainable by cutting of the throat arteries and veins.

The present system avoids the difficulties caused by inefficient knife cutting. The kill being positive and virtually instantaneous, there is no possibility that a bird can reach the scalding bath still alive, and hence it cannot drown or breathe contaminated water into its lungs.

Its trachea cannot be cut, so it does not fight or struggle to scatter blood everywhere, or break its wings or acquire skin bruises to itself or inflict them on adjacent birds, as is often the result of such struggling. Such damage downgrades carcasses and reduces their value. Full bleeding is assured, contrary to frequent cases to the contrary if the jugular veins are not properly severed in the knife method, so that no misbled carcasses or "cadavers" are produced. Also, it has been found that direct, massive damage to the brain does not cause the muscular spasm which occurs when the spinal column is nicked, by a throat-cutting knife, thereby promoting easier removal of feathers in the picking machines. Also, the process does not provide openings in the neck skin through which water of the scalding bath could enter to contaminate the neck flesh, so that the entire neck is preserved safe for use. Any such contamination is confined to the head itself, which is later cut off and discarded in one portion of the evisceration process, which is performed after picking.

If the killing is to be performed as the birds move along a conveyor line suspended in a head-down position, as is customary in present killing methods to prevent blood from flowing over other parts of the carcass, the skull opening contemplated by the present invention is most advantageously formed in the forepart of the skull, somewhat above the eyes. Not only does this assist in efficient drainage of the blood, this being the lowermost point of the bird when so suspended, but also it places the wound as far as possible from the neck to further avoid any possible contamination of the neck.

Finally, the present method may include the preliminary step, prior to opening of the skull, of stunning each bird, such for example as by an electric shock. This preliminary step has the functional advantage of rendering the immobilization or placement of the head preparatory to the skull-opening step. It may also placate those who feel that, without such step, the present method would be unduly cruel or inhumane. Actually, it is not, so long as the skull wound is inflicted with great speed as is easily possible. Death is virtually instantaneous, and less cruel to the bird then death by bleeding from a throat cut by a knife, or death by strangulation or suffocation if the knife wielder cuts the trachea, or death by drowning in scalding water if the bird has not died by the time it reaches the scalder.

While I have described a specific form of my invention, it will be readily apparent that many minor changes could be made without departing from the spirit of the invention.

What I claim as new and desire to protect by Letters Patent is:

1. The method of killing and bleeding poultry consisting of forming an opening through the skull of each bird and extending into the brain cavity, said opening being formed in an exterior portion of the skull not within the mouth or throat cavity.

2. The method as recited in claim 1 wherein said opening is sufficiently large and extends sufficiently far into the brain cavity, to insure rapid and thorough bleeding of the carcass.

3. The method as recited in claim 1 wherein said skull opening is formed in the forepart of the skull most remote from the neck.

4. The method as recited in claim 1 wherein the skull opening is formed while the bird is suspended in a head-down position.

5. The method as recited in claim 1 wherein the skull opening is formed while the bird is suspended in a head-down position, and wherein the skull opening is formed in the forepart of the skull most remote from the neck.

6. The method as recited in claim 1 with the addition of the preliminary step, prior to the formation of the skull opening in the head of each bird, of stunning each bird to render it substantially unconscious.

* * * * *